L. L. HILL.
Making Oil and Water Gas.
No. 1,497. Reissued June 16, 1863.
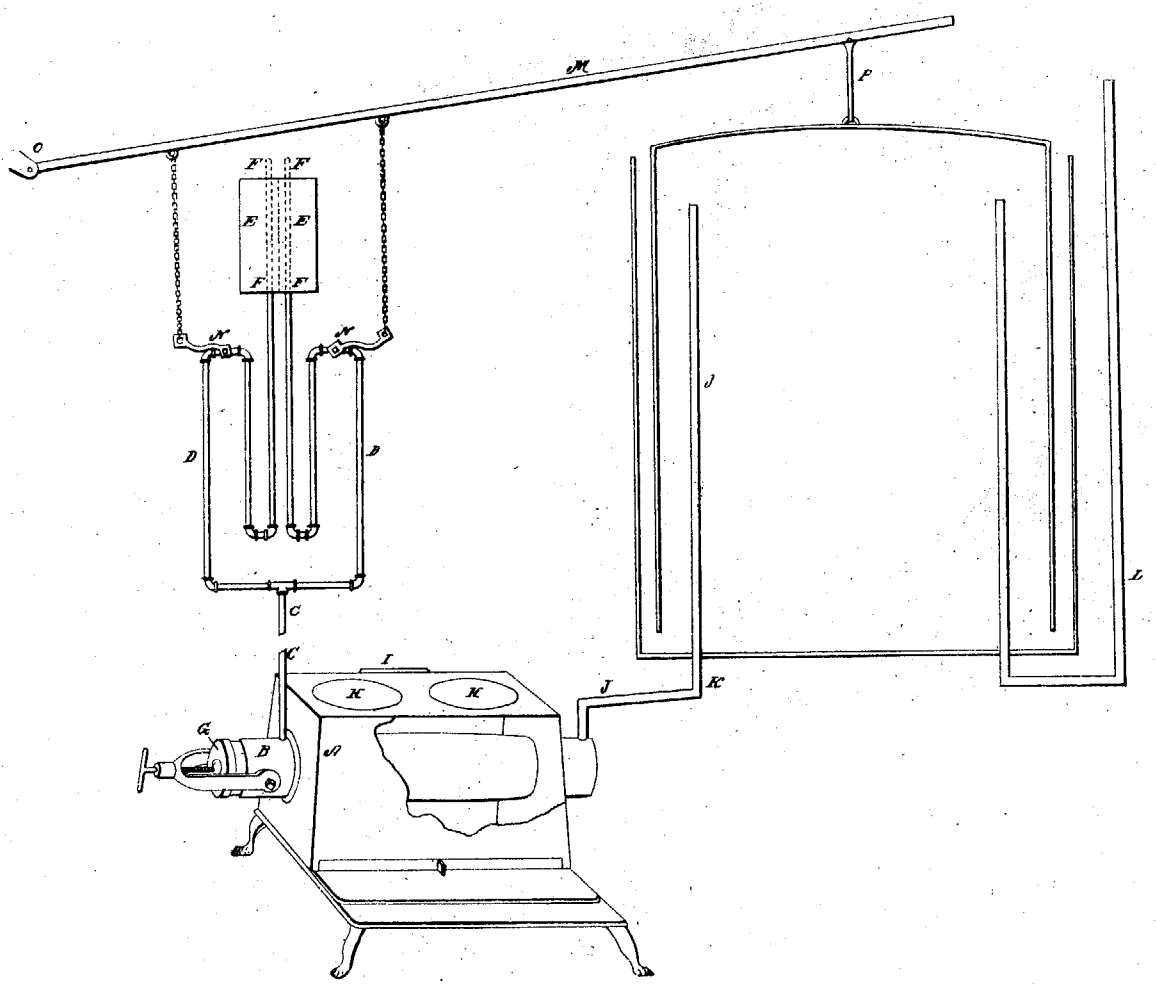
Witnesses:
Geo. B. Hill
D. K. Browne.
Inventor:
Lewis L. Hill.

UNITED STATES PATENT OFFICE.

LEVI L. HILL, OF HUDSON, NEW YORK.

IMPROVEMENT IN MAKING ILLUMINATING-GAS.

Specification forming part of Letters Patent No. 35,616, dated June 17, 1862; Reissue No. 1,497, dated June 16, 1863.

*To all whom it may concern:*

Be it known that I, LEVI L. HILL, of Hudson, in the county of Columbia and State of New York, have invented a new and Improved Mode of Generating Gas, intended chiefly for illuminating purposes; and I do hereby declare that the following is a full, clear, and exact description thereof.

The nature of my invention consists in a process for generating an illuminating-gas by the decomposition of water and oleaginous substances simultaneously applied to incandescent carbonaceous materials recently produced by the expulsion of the volatile parts of wood or bituminous coal.

To enable others skilled in the art to practice and use my invention, I will proceed to describe it in conjunction with and by the assistance of the drawing hereto annexed. Other forms and arrangement of apparatus may be adopted; but this I have found entirely satisfactory in practice and to fully exhibit the principles of my invention. As this invention relates only to the process, the device here represented will serve as well as any other to elucidate it.

In the drawing, A and B represent a stove and the retort therein.

C indicates the main feed-pipe, and D D its branches, twice bent and terminating in a double can, E E, and arranged with regulating holes and wires F F F F. The holes are in the top end of feed-pipes, and the wires run through these holes and project upward through the top of the can, so that they can be pushed up and down in case of cloggage. The size of the wires relatively to that of the holes regulates the amount of flow. The cap of the retort is marked G. The boiler-openings of the stove are marked H H, and I indicates the smoke-pipe.

J J is the discharge gas-pipe, provided with a valve, K, to prevent a return of gas into the stove in case of a fracture of the retort.

L is the service-pipe, and M the lever for closing the stop-cocks N N. This lever has its fulcrum at O, and is lifted by pin P, being so arranged that it shall be lifted just before the gasometer is full. A cord or chain may be used instead of the lever.

The retort may be made of cast-iron or any other suitable material, one end permanently closed, the other open, but capable of being closed perfectly by a cap or head, and having two side openings—one at or near each end—for the main feed-pipe C and the discharge gas-pipe J J. One of the cans E E is for water, the other for a hydrocarbon fluid, and are both connected with the main feed-pipe C by separate pipes D D. The eduction or discharge pipe J J, which is connected with the retort at the other or back end, conducts the gas to the gasometer. When the gasometer has been lifted to a certain height by the influx of gas, it operates the lever M, and thus closes the stop-cocks N N, cutting off the flow of the water and hydrocarbon fluid to the retort, and consequently stopping the generation of the gas. From this it will be seen that if the gas generated and passed into the gasometer be used as fast as it is made the process will be continuous until the materials used are exhausted; but if it be generated more rapidly than it is consumed the process can only go on until the gasometer is filled. The check-valve K prevents the reflow of the gas from the gasometer into the retort, and thus prevents the escape of any of it when it is necessary to recharge the retort or when this part becomes cracked or burned out during the operation.

For portable gas-works arranged in this manner I make the retort about thirty inches long and four inches in diameter inside, and place it transversely across the center of a small stove, the two ends projecting from the sides by openings in the sides of the stove. This stove is about twenty inches long, twelve inches wide, and twelve inches high, and provided with boiler openings for cooking purposes, so that the gas required for an evening's use may be made with the same heat that cooks the daily meals. This, with a suitable gasometer and fixtures, makes a very convenient arrangement for domestic purposes; but where other purposes on a larger scale are required other arrangements may be adopted.

My method of operating with this apparatus is as follows: When wood is used, I charge the retort with small billets of this material, preferring those kinds of wood which yield by destructive distillation a considerable quantity of gas. When coal is used, I charge the retort in like manner with that of a bituminous character, that I may have the benefit of the ordinary illuminating-gas produced by the distillation of the material before it becomes reduced to coke. Having secured the cap properly upon the retort, I kindle the fire and bring the retort to a bright-red heat. When this temperature is attained, nearly the whole of the volatile matters will have been expelled from the wood or coal, if no impediment be offered to their free escape, and there will be left in the retort either charcoal or coke, incandescent and almost entirely freed from bituminous matters, moisture, and such other substances as are volatile at this temperature. In the meantime, while this part of the process is going on, or before, one of the cans E is to be charged with water, the other with the hydrocarbon fluid; and when the retort has reached the temperature just indicated the two stop-cocks N N in the feed-pipes are opened, and the two fluids, in due proportion, allowed to flow into the retort.

The charcoal or coke, just reduced from wood or coal and still incandescent, is in the most favorable condition for prompt and energetic action upon the two fluids. The theory of the action and reaction that then take place between the three substances may be presumed to be this: The oxygen of the water combines with a portion of the carbon of the charcoal or coke, forming carbonic oxide or carbonic acid, or both. The hydrogen of the water, being set free, combines with the excess of carbon in the hydrocarbon fluid, and thus converts this fluid into a permanent hydrocarbon gas, and which results in producing from the same amount of a hydrocarbon fluid some four or five times as much gas as could be obtained simply by its destructive distillation. In this operation it is also very probable that some portion of the liberated hydrogen in its nascent state combines with the carbon of the charcoal or coke, and in this manner actually increasing the volume of the hydrocarbon gases evolved. The gas thus produced passes into the gasometer, mixing there with the previously-formed gas from the wood or coal, the combination yielding a very superior illuminating-gas at a very moderate cost.

In this process I prefer the heavy or paraffine oil of coal or petroleum, but can use oil or any other fluid hydrocarbon, and by placing one of the cans E within the other and supplying the outer with hot or boiling water can use those that are solid at ordinary temperatures. The gas produced by this process may be used for any of the purposes to which ordinary illuminating-gas is applied.

Having thus fully described my invention, what I claim in relation thereto, and desire to secure by Letters Patent of the United States, is—

1. Generating gas for illuminating and other purposes by bringing water and a hydrocarbon fluid simultaneously in contact with freshly-formed incandescent charcoal, substantially as set forth.

2. Generating gas for illuminating and other purposes by bringing water and a hydrocarbon fluid simultaneously in contact with freshly-formed incandescent coke, substantially as set forth.

3. The use of freshly-formed incandescent charcoal or coke for the decomposition of water or a hydrocarbon fluid, or of both combined, when applied simultaneously to the charcoal or coke, for the production of gas for illumination and other purposes, substantially as described.

4. The combination of the gas from the distillation of wood with that produced from the action of water and a hydrocarbon fluid simultaneously applied to the freshly-formed incandescent charcoal from the wood, in the manner substantially as set forth, for the production of gas for illuminating and other purposes.

5. The combination of the gas from the distillation of bituminous coal or its equivalent with that produced from the action of water and a hydrocarbon fluid simultaneously applied to the freshly-formed incandescent coke from the coal, in the manner substantially as set forth, for the production of gas for illuminating and other purposes.

LEVI L. HILL.

Witnesses:
TAPPEN TOWNSEND,
WYMAN R. BARRETT.